Nov. 19, 1946.  F. D. PRAGER  2,411,390
LIQUID TREATMENT
Filed April 3, 1944   2 Sheets-Sheet 2
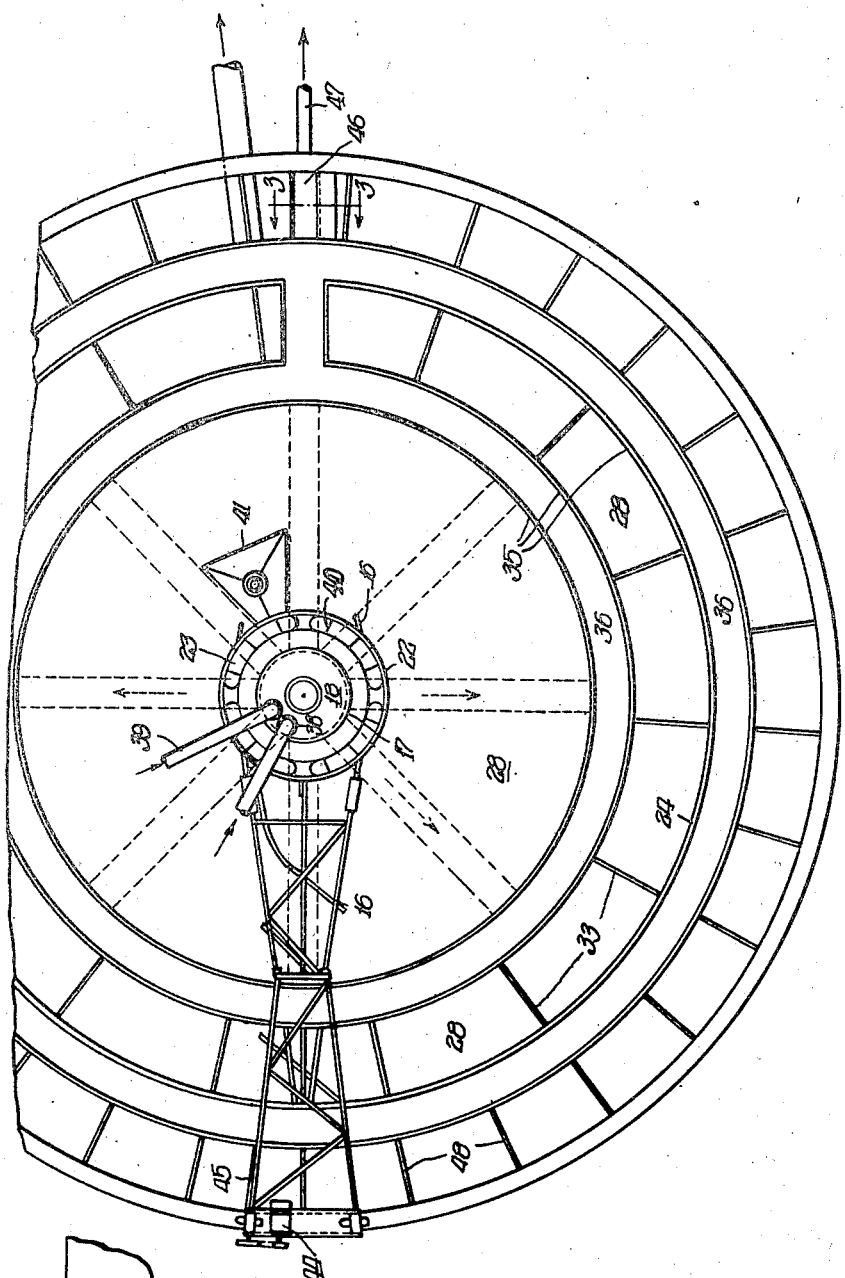
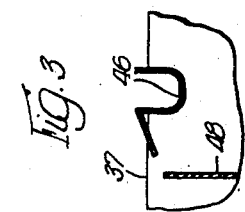
INVENTOR.
Frank D. Prager Patented Nov. 19, 1946

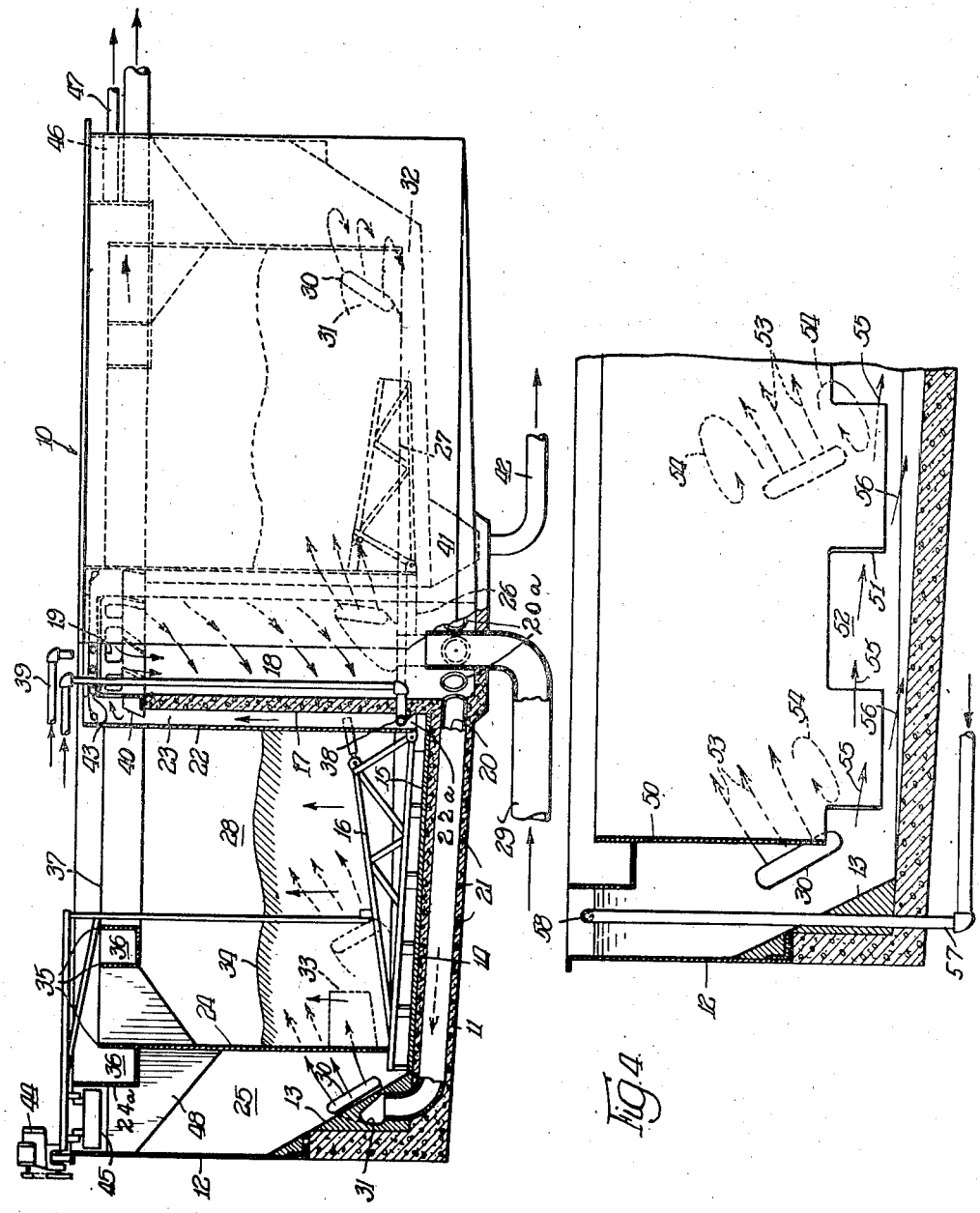

2,411,390

UNITED STATES PATENT OFFICE 2,411,390

LIQUID TREATMENT

Frank D. Prager, Chicago, Ill., assignor to Graver Tank & Mfg. Co., Inc., a corporation of Delaware Application April 3, 1944, Serial No. 529,333

13 Claims. (Cl. 210—16)

This invention relates to liquid treatment and particularly to the removal of impurities from liquids by precipitation, aided by sludge filtration and recirculation.

It is an important object of this invention to improve over previous devices for distributing liquid flows to be exposed to sludge filtration, particularly in large tanks.

It is one particular object hereof to transfer liquid mixed with chemicals and sludge from the central to the peripheral part of a treatment tank in a manner involving the least possible obstruction to the necessary flows in the clarification and sludge filtration zone contained in the tank.

Another particular object is to transfer such materials from a central to a peripheral part in a manner which allows the use of an efficient and economical type of sludge scraping equipment.

Another object is to provide improved inlets or outlets in an annular channel zone surrounding a sludge filtration tank.

Still other objects will appear from the following description.

In the drawings,

Fig. 1 is an elevation, partly in section, of one embodiment of this invention.

Fig. 2 is a plan view of the apparatus of Fig. 1.

Fig. 3 is a partial section, along lines 3—3 in Fig. 2; and

Fig. 4 is a fragmentary, sectional elevation of a modified embodiment.

The tank 10 has a flat circular bottom 11 of reinforced concrete. The side wall 12 is cylindrical and made of steel. A lower portion 13 of the wall is an inverted cone frustum made of concrete, upstanding from the periphery of the bottom 11. The bottom 11 has a slight inward slope to facilitate an occasional draining of the tank. A thin layer of fine grout 14 forms the upper part of this bottom; this grout being applied in a plastic condition when the rough concrete work has been completed. A proper, flat or smooth top surface 15 of the bottom, for the uniform accumulation and quiescent scraping off of settled sludge, is obtained by rotating the sludge scraper assembly 16 over this grout before the grout has solidified. Thereafter the sludge scraper assembly is raised a fraction of an inch.

Concentrically with the tank, a concrete column 17 extends upwardly from the bottom 11. This column, and the central part of the bottom below it, are hollow, providing a cylindrical, central downflow zone 18. Openings 19 are provided in the top of the column, slightly below the top of the tank. The lower part of the column is imperforate but a number of steel pipes 20 communicate with the lower part of the downflow zone 18 within the hollow column and extend radially below the grouted surface 15 toward the wall 12. These radial steel pipes form flow passage means, as will be explained, and also serve to reinforce the concrete bottom 11; suitable reinforcing wires 21 being provided between these radial pipes within the concrete bottom 11, and having their ends welded to the pipes. In earlier constructions, somewhat similar flow passage means were installed in upper parts of the tank. When so installed they obstructed the upward flow in said upper parts; they tended to interfere with certain desirable types of rotating scraper assemblies; and moreover their installation in such upper parts involved expensive means and methods of construction. The absence of such pipes in the upper part of the tank is one of the advantages of the present invention.

Adjacent to the concrete column 17 and concentrically surrounding the same I provide a steel drum 22, forming an upflow zone 23 between this drum and the column. This upflow zone communicates with a lower, central part of the tank, by means of the lower, open end 22—A of the drum 22. The two zones 18 and 23 may be referred to as parts of a central flow collecting zone, in view of the operation to be described hereinafter. The two members 17 and 22, which are centrally located, annular wall means confining said rspective zones, are similarly classifiable as parts of a central flow collector means. The lower, open end 22—A of the drum 22 forms the inlet of this flow collector means 17, 22, or more specifically, the inlet of the upflow portion thereof. Concentrically with the wall 12 and adjacent this wall I provide a large steel drum, baffle, wall or partition 24, forming an annular peripheral channel zone 25 between the wall 12 and the drum 24. The drums 22 and 24, or parts integral therewith, extend downwardly, respectively, to points 26 and 27 at suitable elevations above the surface 15. A clarification zone or chamber 28 is formed by and within the outer drum 24, outside the inner drum 22. This clarification zone has much greater area and volume than the peripheral channel 25, which in turn is considerably larger than any of the other zones of the tank, in order to insure proper flow velocities, as will be explained hereinafter.

The downflow zone 18 receives raw liquid thru the inlet pipe 29 which enters thru the bottom 11 into a part of this zone, above the bottom thereof, centrally of the inner ends 20—A of the several steel pipes 20. Thus the flow from the inlet pipe is uniformly distributed to the several pipes 20. These pipes 20 discharge into the peripheral channel 25 through discharge openings 30 which are uniformly distributed along the channel and which are located above the lower limit 27 of the outer drum 24, but below the top of the tank. Adjacent each opening 30 the respective steel pipe 20 merges into a discharge chamber 31 cored into the concrete of the conical wall 13 and discharging into the peripheral channel 25 in uniform upward and lateral directions, about 45 degrees inclined from the horizontal. As a result, the liquid is injected into the peripheral channel in a plurality of inclined jets, tending to produce a general horizontal rotation, and local up and down agitation of the liquid in the peripheral channel.

This jet action with up and down agitation is substantially confined to the peripheral channel, by virtue of the aforementioned outer drum 24 extending to the level 27 below the discharge openings 30, but the general horizontal rotation in the peripheral channel tends to continue in the clarification zone 28, as the rotating liquid enters this zone thru a long and wide slot 32, between the surface 15 and the lower edge of the outer drum. Accordingly, the liquid tends to continue its rotation in the bottom part of the clarification zone 28, but this continued rotation can be prevented, or can be deflected into vertical circulations, and ultimately stopped, by deflecting baffles 33 which are known from earlier constructions. Such deflecting baffles can be located at and extend to any desired points outside or inside of the large drum 24, depending on whether the sludge formed in the process, and to be suspended in the sludge bed, is relatively light or heavy, requiring more or less of said vertical circulations in the clarification zone 28. A suspended sludge bed 34 is provided and maintained in the clarification zone in known manner, and the liquid percolates thru the sludge bed, in a generally upward direction. Treated liquid is withdrawn above the sludge bed 34 by overflow weirs 35 with effluent launders 36 of known construction.

Once that the tank is filled the weirs 35 prevent the liquid level 37 from falling below said weirs. The liquid level 37 is prevented from rising above the top of the tank by conventional control means, not shown. The inner drum 22 extends above the liquid level 37, and the outer drum or baffle 24 is integral with one wall 24—A of the outermost launder 36, which wall also extends above the liquid level 37. By means of this arrangement, the peripheral channel 25 and the central upflow zone 23 communicate with the clarification zone 28 only in the lower parts thereof. This forces all of the rotating liquid from the peripheral channel to enter the bottom of the clarification zone, and similarly, all liquid withdrawn into the upflow zone is removed from the bottom of the clarification zone.

The rotary liquid flow is augmented by a circulation, which can also continue during any slowdown or complete shutdown of the inflow thru the pipe 29. This circulation is established and maintained in well-known manner, for instance by an air lift device 38, mounted on the column 17 in the lower part of the upflow zone 23, and releasing compressed air into that zone. The release of air is conducive to the development of relatively high pressure above the air lift device and suction below the same. As a result, a stream of air and liquid rises in the upflow zone 23; air escapes at the top of that zone; liquid flows through the openings 19 down thru the central downflow zone 18 in the hollow column; then outwardly thru the radial steel pipes 20, then around the peripheral channel 25, with local up and down currents, then inwardly and rotatingly over the bottom of the clarification and sludge bed zone, and finally back into the upflow zone 23.

The velocity of this circulation is suitably regulated by control means, not shown, in the supply line for compressed air leading to the air lift device 38, in manner known from earlier construction. The several parts of the tank are so dimensioned that the circulating flow is relatively rapid in the up and downflow zones and in the radial pipes, suitably slower in the peripheral channel, and still slower over the bottom of the sludge bed zone. In general, the aggregate or total flow area of the several pipes 20 equals the area of the downflow zone and this in turn equals the area of the upflow zone, these areas being so dimensioned that with proper amounts of liquid recirculated, the liquid velocities thru these areas amount to about 2 feet per second, with at least 50% variation plus or minus, depending on local conditions. The velocities in the peripheral channel and over the bottom of the tank generally range downward from 1 foot per second to only a few inches, or sometimes fractional inches per second. In the upper parts of the peripheral channel and clarification zone, the preferred velocities amount to only a few inches per minute, at most. However, a somewhat higher velocity and agitation can be tolerated in the top of the channel, which serves for scum release, than in the clarification zone, due to the relatively rapid rising rate of even minute air bubbles agglomerated with scum particles.

Any chemical re-agents needed to precipitate the sludge are added to the circulating liquid by the pipe 39 terminating adjacent the top of the upflow zone, where rapid and complete mixing is insured by vanes 40, deflecting the rising stream of air and liquid into a horizontal rotation, in the top of the upflow zone. These vanes and the horizontal liquid rotation which they set up, serve also to dampen any surges of the air and liquid stream, whereby they prevent any drops of liquid from being projected upwardly over the top of the drum 22.

The circulating liquid, which carries any required chemicals, spirals down the central zone within the hollow column, and meets the raw liquid entering the inlet pipes to be mixed with the same. Mixing energy and turbulence is insured by the flow velocity of the circulating liquid, and any continuing rotation thereof. Due to this turbulence, the several constituents are intimately mixed in the bottom part of the downflow zone. Turbulence and agitation continue in the radial flow passages 20. Agitation with suitably lower velocity prevails in the peripheral channel and at the bottom of the sludge bed 34, and some minute agitation continues in the sludge bed itself. The slowest liquid velocities are maintained above this bed, in the large, unobstructed upper part of the clarification zone. Under conditions of overload and the like, there may be a tendency for certain sectors or constituents of the sludge bed to boil up toward the water level, but due to the large and unobstructed construction and other features of this apparatus, such tendencies are efficiently checked and the apparatus delivers treated and clarified liquid at increased flow rates, as compared with earlier devices operating under comparable conditions.

Generally I prefer to control the liquid velocities in the clarification zone so as to allow and force the largest sludge particles to settle out on the flat surface 15. Frequently some sludge tends to settle also in the peripheral channel, between the discharge openings 30. In all other parts of the tank, liquid velocities are such as to prevent sedimentation of sludge. Any sludge sediment from the peripheral channel slides down the inclined wall 13 and collects on the flat surface 15, together with the sludge from the clarification zone 28. All this sludge is scraped from the flat surface 15 by the scraper assembly 16, which rotates slowly around the central column 17, and shifts the settled sludge into a sump 41, formed in the bottom 11 adjacent the central column. From here the sludge is ultimately withdrawn thru a pipe 42 with suitable, well known controls, not shown. The rotary velocity of the scraper assembly 16 is selected to prevent any undesirable stirring up, or deflecting, of sludge and liquid currents in the clarification zone.

The scraper assembly 16 is fastened to the lower part of the drum 22 which rotates slowly together with the scraper assembly, and which is supported by bearing members 43; these bearing members in turn being supported by the hollow column 17. By means of this central, elevated bearing support, the weight of the scraper assembly, which may amount to several tons, is efficiently balanced and absorbed.

The scraper assembly is preferably driven by a traction drive assembly 44 of known construction, adjacent the side wall 12. It will be noted that with the aforementioned prior construction, using distributing pipes in the top of the tank, it was impossible to provide such desirable and efficient traction drives, inasmuch as the distributing pipes interfered with such a traction drive.

The general advantages of traction drives are well known and will not be described. A special advantage resides in the fact that such a drive is most conveniently provided with a scum removal blade 45 depending from the outer parts of the traction drive on top of the peripheral channel 25 and suitably cooperating with a stationary scum shelf and trough 46 in the same channel (see Fig. 3); both blade and trough generally being installed in substantially radial directions across the top of the channel (see Fig. 2) and the trough being suitably emptied by a pipe 47. The chemical treatment, particularly in connection with the air lift, promotes flotation of relatively light particles, and such particles are readily released in the peripheral channel 25. Quiescent conditions are established in the top of this channel, by means of radial vanes 48, which may also support the large baffle 24 and parts mounted thereon.

In the modification of Fig. 4, the large peripheral baffle does not have to extend downwardly to points 27 below the discharge openings 30, as in the preferred embodiment. In this modification the large baffle 50 has only spaced lower portions 51 extending downwardly to points below said openings, while large windows 52, of considerable height are provided between said spaced portions 51. This may be desirable, above all, in relatively deep tanks, and where a large area is not so readily provided. With this arrangement, a relatively deep layer of liquid and sludge will rotate in the lower parts of the sludge bed. As a result, the volume of the peripheral channel 25 can be made smaller, by reducing the width and area thereof, and adequate flocculation is still provided. Desirably, the windows 52 are located between the discharge openings 30, and the solid lower skirts 51 in front of said discharge openings, so that the up-and-down flows 54, produced by the liquid jets 53 in the channel, may not interfere with the necessary, relatively quiescent conditions inside of the large baffle 50. Of course, the liquid flows 55 entering this inner space may have any desired velocity, depending on the size of the windows 52.

In order to prevent any settled sludge from collecting behind the baffle skirts 51, in the peripheral channel, these skirts do not merge with the tank bottom, but allow the sludge to slide down the inclined wall 13 and into the inner space, in a flow shown at 56.

The modified embodiment includes also a system of auxiliary or alternative flow passage means 57, extending from the central mixing zone to points above the liquid level 37 and discharging recirculated liquid into the peripheral channel, in directions tangential of the channel, through outlet L fittings 58, whereby the recirculated liquid can be inspected and sampled.

It is often desirable to provide at least one recirculating pipe 20 with such a sampling arrangement, for close control over the condition of the circulating floc. It is not quite sufficient, in many instances, periodically to sample the floc in the channel 25, although this should be done also. It is inherent in the rapid chemical mixing stage, through which the circulating floc must pass, that the floc is broken up to some extent. In the presence of proper chemical and pH conditions, the comminuted floc is promptly built up again, as soon as flow conditions of less turbulence are established; that is, upon discharge into the peripheral channel. In fact, more settleable ultimate flocs are formed in this manner than without any breakup of flocs.

With the modified arrangement it is easy to sample both the comminuted floc discharged at 58 and the re-flocculated particles in the top of the channel 25. Such sampling of the comminuted floc is preferable over the prior method frequently used in plants of this general type, wherein small sampling pipes, independent from the main flow passages, are brought to the several flows to be sampled. This earlier method furnishes indefinite samples, due to the additional, indefinite comminution of flocs in the separate sampling pipes. It is preferable to use the combined flow passage and sampling pipe 57, either alone or suitably alternating with the pipes 20.

Of course, all this is possible only if the skimming device 45, 46 can be eliminated. In some cases it is preferable to have that skimming device, and in others, to provide the sampling flow passages.

Various other modifications will occur to persons skilled in the art.

I claim:

1. In a liquid treatment tank, a bottom having a substantially flat circular top surface for the uniform accumulation of settled sludge; a side wall upstanding from a peripheral part of said bottom; an annular baffle downwardly extending in the tank to define a channel outside said baffle and a clarification chamber inside the same, said baffle being so located that said channel has considerably less area than said chamber, and said baffle terminating above said bottom so that the lower part of said channel communicates with the lower part of said chamber; flow collector means in the tank, having an inlet in a lower, central portion of said chamber and comprising centrally located, annular wall means in the tank; a set of flow passages extending below said surface, communicating with and outwardly radiating from said flow collector means, and also communicating with said channel by means of discharge openings distributed along said channel, the total flow area of said flow passages being considerably less than that of said channel; means to circulate liquid from said clarification chamber into said flow collector means, outwardly through said flow passages, through said channel, inwardly over said surface, and back into said flow collector means; means to deliver liquid to be treated and any chemical reagents required into the circulating liquid; outlet means for treated liquid in the top of said chamber; a sludge outlet sump in said bottom; a sludge scraper assembly rotatably disposed over said surface to scrape sludge into said sump; and means to rotate said assembly.

2. Apparatus according to claim 1, wherein said means to rotate said sludge scraper assembly comprises a movable traction drive means secured to an outer part of said scraper assembly and having driving engagement with stationary means adjacent the top of the tank.

3. In a liquid treatment tank, a bottom having a substantially flat circular surface for the uniform accumulation of settled sludge; a side wall upstanding from a peripheral part of said bottom; an annular baffle downwardly extending in the tank to define a channel outside said baffle and a clarification chamber inside the same, said baffle terminating above said bottom so that the lower part of said channel communicates with the lower part of said chamber; a column extending upwardly from said bottom in the center of the tank, said column and the central portion of the bottom below it being hollow; a drum concentrically surrounding said column, extending from the top of the tank to above but relatively adjacent said bottom, and so arranged that the space within the drum communicates with the inside of said hollow column, whereby said drum and column provide a flow collector having an inlet in a lower, central portion of said chamber; a set of flow passages extending through said bottom, communicating with and outwardly radiating from an inner, lower part of said flow collector, and also communicating with said channel by means of discharge openings distributed along said channel, the total flow area of said flow passages being considerably less than that of said channel; means to deliver liquid to be treated and any chemical reagents required into said flow collector; means to circulate liquid from said clarification chamber into said flow collector, outwardly through said flow passages, through said channel, inwardly over said surface, and back into said flow collector; outlet means for treated liquid in the top of said chamber; a sludge outlet sump in said bottom; a sludge scraper assembly rotatably disposed over said surface to scrape sludge into said sump; and means to rotate said assembly.

4. Apparatus according to claim 3, wherein said drum, concentrically surrounding said column, is rotatably supported thereby, and forms part of said sludge scraper assembly.

5. Apparatus according to claim 3, wherein said means to circulate liquid is supported by said column.

6. In a liquid treatment tank, a bottom; a side wall upstanding from a peripheral part of said bottom; a substantially cylindrical baffle concentrically installed in the tank to define a channel outside said baffle and a clarification chamber inside the same, said baffle being so located that said channel has considerably less area than said chamber, and said baffle terminating above said bottom so that the lower part of said channel communicates with the lower part of said chamber; flow collector means in the tank, having an inlet in a lower, central portion of said chamber and comprising centrally located, annular wall means in the tank; a set of flow passages extending through said bottom, communicating with and outwardly radiating from said flow collector means, and also communicating with said channel by means of discharge openings distributed along said channel, the total flow area of said flow passages being considerably less than that of said channel; means to circulate liquid from said clarification chamber into said flow collector means, outwardly through said flow passages, through said channel, inwardly over said bottom, and back into said flow collector means; means to deliver liquid to be treated and any chemical reagents required into the circulating liquid; outlet means for treated liquid in the top of said chamber; and sludge outlet means in a lower part of said tank.

7. Apparatus according to claim 6 wherein said discharge openings are located in said wall, opposite said baffle.

8. Apparatus according to claim 6 wherein said discharge openings discharge in directions at least comprising inward components.

9. Apparatus according to claim 6 wherein said discharge openings discharge in directions at least comprising upward components.

10. Apparatus according to claim 6 wherein said discharge openings discharge in directions comprising at least components tangential of said baffle.

11. In a liquid treatment tank, a bottom; a side wall upstanding from a peripheral part of said bottom; an annular baffle downwardly extending in the tank to define a channel outside said baffle and a clarification chamber inside the same, said baffle being so arranged that said channel has an open top, and said baffle terminating above said bottom so that the lower part of said channel communicates with the lower part of said chamber; flow collector means in the tank, having an inlet in a lower, central portion of said chamber and comprising centrally located, annular wall means in the tank; a set of flow passages, communicating with and outwardly radiating from said flow collector means, and also communicating with said channel by means of discharge openings distributed along said channel between the top and bottom of the tank, the total flow area of said flow passages being considerably less than that of said channel; means to circulate liquid from said clarification chamber into said flow collector means, outwardly through said flow passages, through said channel, inwardly over said bottom, and back into said flow collector means; means to deliver liquid to be treated and any chemical reagents required into the circulating liquid; outlet means for treated liquid in the top of said chamber; sludge outlet means in a lower part of said chamber; a substantially stationary scum trough in the top of said channel; a movable scum blade associated with said trough; power means to move said blade along the top of said channel; and an outlet for said trough.

12. Apparatus according to claim 11 comprising a stationary scum shelf associated with said trough, said shelf and trough spanning the top of said channel, and said power means being adapted to move said blade along the top of said channel, up said shelf, and over said trough.

13. Apparatus according to claim 11 comprising baffles extending between said side wall and said annular baffle, through a part of said channel above said discharge openings but below the top of the tank, whereby the upper part of said channel forms a quiescent scum release zone, while the lower part of said channel forms an agitated flocculation zone.

FRANK D. PRAGER.